Sept. 13, 1932. H. KÜCHENMEISTER 1,877,731
SOUND REPRODUCING APPLIANCE HAVING A FILM RECORD
Filed Oct. 29, 1927
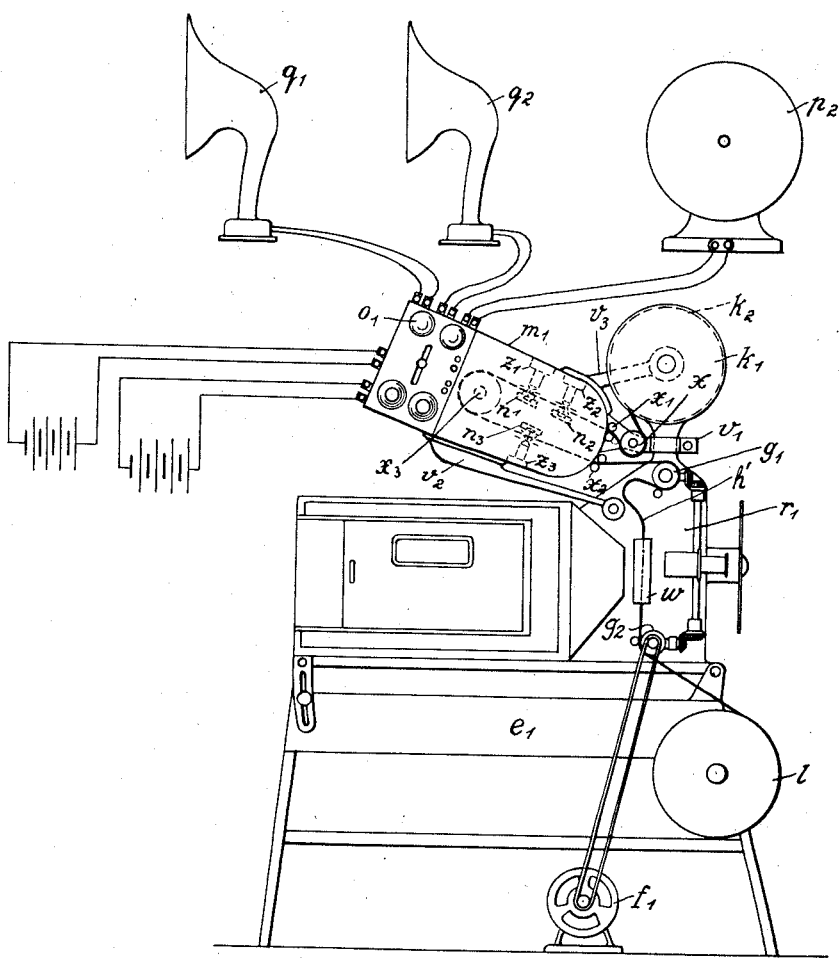
Inventor:
Heinrich Küchenmeister
by Knight Bros
Attorney Patented Sept. 13, 1932

1,877,731

UNITED STATES PATENT OFFICE

HEINRICH KÜCHENMEISTER, OF BERLIN, GERMANY

SOUND REPRODUCING APPLIANCE HAVING A FILM RECORD

Application filed October 29, 1927, Serial No. 229,758, and in Germany November 2, 1926.

My invention relates to sound-reproducing appliances having a film record, and it is an object of my invention to provide an appliance of this type which is adapted to co-operate with a cinematograph apparatus.

With this object in view, I so design my appliance that it is actuated by the driving mechanism of a normal cinematograph apparatus and is under the control of its regulator, slip clutches being provided if necessary.

In this manner the appliance is combined into a unit with the instrument aforesaid and operated in strict synchronism with its operation.

It has already been proposed to combine a talking machine and a cinematograph apparatus but in these synchronism—to certain extent—was achieved only by great skill of the operator, or by very complicated mechanisms. It has also been proposed to operate a film record together with a picture film.

My novel appliance is distinguished from these old instruments in that, as mentioned, the driving mechanism of the cinematograph apparatus is utilized, together with their means for obtaining uniform speed, and perfect synchronism is attained in this manner, the entire apparatus being controlled by a regulating device for the cinematograph apparatus and the sound reproducing appliance.

My appliance may be so designed as not to require any alterations in the design of the cinematograph apparatus, so that the normal function of this apparatus is not interfered with.

In the accompanying drawing, an appliance adapted to be fitted to a cinematograph apparatus is illustrated by way of example.

Referring now to the drawing, $r'$ is a cinematograph apparatus on a frame $e'$, $h'$ is a combined picture film and sound record, $g'$ and $g_2$ are feeding sprockets for the film, $f'$ is a motor actuating the sprockets, $k'$ and $l$ are the reels on which the film $h'$ is carried, $k_2$ is a casing for the reel $k'$, and $m'$ is a casing for the self-contained sound reproducing unit which is supported by a bracket $v_2$. The film is guided by means of a guide roller $x$ and is introduced past rollers $x'$ and leaves the casing past rollers $x_2$, passing over a roller $x_3$ at the end of the casing, and $n'$, $n_2$, $n_3$, $z'$, $z_2$, and $z_3$ are transformation and illuminating members respectively for scanning the sound record. The rollers $g'$ and $g_2$ are positively connected so that the film is moved in the cinematograph apparatus $r'$ at exactly the same speed as in the casing $m'$, and the required synchronism is attained. $o'$ is an amplifier, $v'$ and $v_3$ are brackets holding the sound unit casing $m'$ on the casing $k_2$ of the reel $k'$, $w$ is the film frame, and $p_2$, $q'$, and $q_2$ are loud speakers for translating into sound impulses the current impulses in the casing $m'$.

The casing $m'$ might also be arranged in front of, and below, the lens of the projection apparatus, or above the lens in which case it is secured to the partition by a bracket.

Instead of a transparent sound record, bands, wires or the like of magnetic material may be provided to which the sound impulses are impressed magnetically. Furthermore, instead of combining a sound record and a picture film, two independent films, or a picture film and a band or the like of magnetic material, may be provided. Obviously, the picture and phonographic films must move on the same sprockets $g'$, $g_2$, or, if the sprockets are separate, they must be connected for synchronized rotation.

The function of the apparatus to which my appliance is fitted, is not interfered with by the appliance, the latter being primarily destined for being adapted to existing instruments in which it is actuated by the motor, and controlled by the regulator, of the instrument.

To facilitate the synchronization, marks may be made on the record and on any or all of the means for feeding it.

I am not limited to the manner of securing the appliance $m_1$ shown and described, as the appliance may be arranged in any suitable position, as in front and below the projection lens, on an independent bracket on the frame $e_1$, or, above, below or at the side of the lens at a wall, for instance the partition which is generally provided for separating the house from the compartment where the apparatus is located.

It has been assumed that the sound curves are generated on the film by photographic means but magnetizable bands, wires, etc., may be provided instead on which the sound impulses are impressed by magnetic means.

Instead of combining a picture and a sound film into a single band, I may provide two independent film bands, or a picture film in combination with a magnetizable band or wire, in which case the picture film may be united with the magnetizable part in known manner. Obviously, when two separate picture and sound parts are provided both must run on the same roller $g_1$, or, if separate supply rollers are provided they must be connected so as to attain synchronism.

It is important that by the appliance for reproducing sound the normal operation of the picture apparatus is not interfered with. By having parts of the picture apparatus co-operating in the sound reproduction the instrument is much simplified and its initial cost is reduced in proportion, and the synchronism required results automatically from the provision of the same motor, and the same regulating means, for both units, without requiring exceptional skill on the part of the attendant, or expensive and complicated mechanism.

The sound reproducing appliance $m_1$ is a closed and independent unit to which the amplifier $o_1$ is readily secured, and the sound transformers in the appliance may be arranged for dephased sound reproduction.

I claim:

The combination with a projecting apparatus comprising film unreeling and reeling means, projecting devices, and guide means for guiding picture record films along a normal path through said projecting devices; of a detachable sound-reproducing unit for reproducing the sound from films having both sound and picture records, said unit comprising a casing containing a light source, a photoelectric cell and means for conducting a film within said casing between said light source and cell, means for supporting said unit at one side of said normal path of picture record films, and guide means with a support therefor mounted outside of and in operative relation with said casing for diverting sound and picture record films laterally from said normal path into said casing.

The foregoing specification signed at Berlin this 14th day of October, 1927.

HEINRICH KÜCHENMEISTER.